United States Patent
Satou

(10) Patent No.: US 8,670,259 B2
(45) Date of Patent: Mar. 11, 2014

(54) CURRENT SOURCE POWER CONVERSION CIRCUIT

(75) Inventor: Toshiaki Satou, Shiga (JP)

(73) Assignee: Daikin Industries, Ltd., Osaka-Shi (JP)

( * ) Notice: Subject to any disclaimer, the term of this patent is extended or adjusted under 35 U.S.C. 154(b) by 474 days.

(21) Appl. No.: 13/132,338

(22) PCT Filed: Dec. 3, 2009

(86) PCT No.: PCT/JP2009/070309
§ 371 (c)(1),
(2), (4) Date: Jun. 2, 2011

(87) PCT Pub. No.: WO2010/073886
PCT Pub. Date: Jul. 1, 2010

(65) Prior Publication Data
US 2011/0242864 A1   Oct. 6, 2011

(30) Foreign Application Priority Data

Dec. 23, 2008   (JP) ................................ 2008-326655

(51) Int. Cl.
*H02M 7/217* (2006.01)

(52) U.S. Cl.
USPC ......................................................... 363/127

(58) Field of Classification Search
USPC ................................................. 363/125, 127
See application file for complete search history.

(56) References Cited

U.S. PATENT DOCUMENTS

| | | | | |
|---|---|---|---|---|
| 5,031,087 A * | 7/1991 | Tuusa | .............................. | 363/63 |
| 7,768,805 B2 * | 8/2010 | Colombi et al. | ................ | 363/89 |
| 8,462,528 B2 * | 6/2013 | Kajouke et al. | ............... | 363/127 |
| 8,467,206 B2 * | 6/2013 | Iturriz et al. | ..................... | 363/70 |
| 2005/0194925 A1 | 9/2005 | Ito et al. | | |
| 2011/0025246 A1 * | 2/2011 | Sakakibara | .............. | 318/400.42 |
| 2011/0134675 A1 * | 6/2011 | Grbovic | ......................... | 363/127 |
| 2011/0242864 A1 * | 10/2011 | Satou | ............................. | 363/127 |
| 2011/0254494 A1 * | 10/2011 | Briane et al. | .................. | 318/503 |
| 2012/0063178 A1 * | 3/2012 | Fujita et al. | ..................... | 363/37 |
| 2012/0250375 A1 * | 10/2012 | Satou | ............................. | 363/37 |
| 2012/0257425 A1 * | 10/2012 | Satou | ............................. | 363/37 |
| 2012/0327694 A1 * | 12/2012 | Satou | ............................. | 363/37 |

FOREIGN PATENT DOCUMENTS

| | | |
|---|---|---|
| CN | 165 8486 A | 8/2005 |
| JP | 3-194971 A | 8/1991 |
| JP | 2001-309670 A | 11/2001 |
| JP | 2002-84757 A | 3/2002 |
| JP | 2003-164140 A | 6/2003 |
| JP | 2005-229676 A | 8/2005 |
| JP | 2007-295686 A | 8/2007 |

* cited by examiner

*Primary Examiner* — Jeffrey Sterrett

(74) *Attorney, Agent, or Firm* — Birch, Stewart, Kolasch & Birch, LLP

(57) ABSTRACT

An example of the current source power conversion circuit is provided with a plurality of half-bridge rectifier circuits which are connected in parallel, each including a serial connection of a first switch circuit having a first self-turn-off element and a first diode which are connected in series to each other, and a second switch circuit having a second self-turn-off element and a second diode which are connected in series to each other. A first current electrode of said first self-turn-off element in one of said half-bridge rectifier circuits and a first current electrode of said first self-turn-off element in other one of said half-bridge rectifier circuits are short-circuited and connected.

20 Claims, 9 Drawing Sheets

F I G . 1
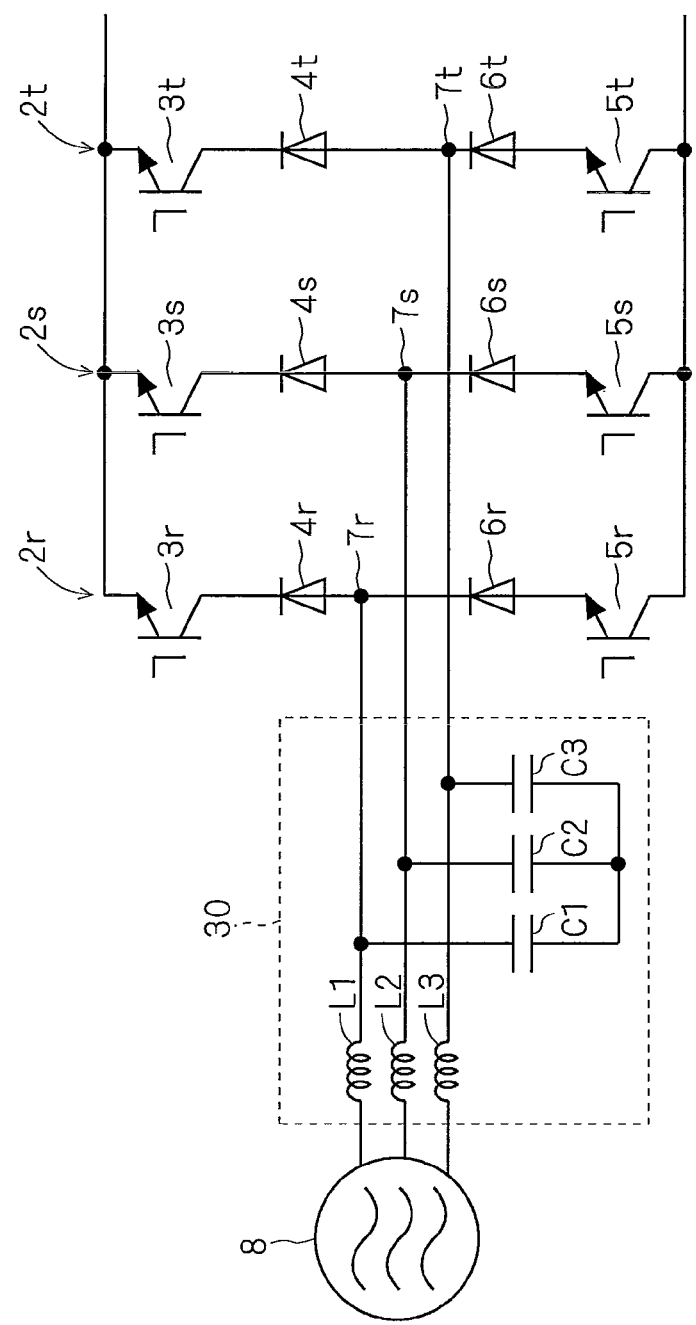

F I G . 3
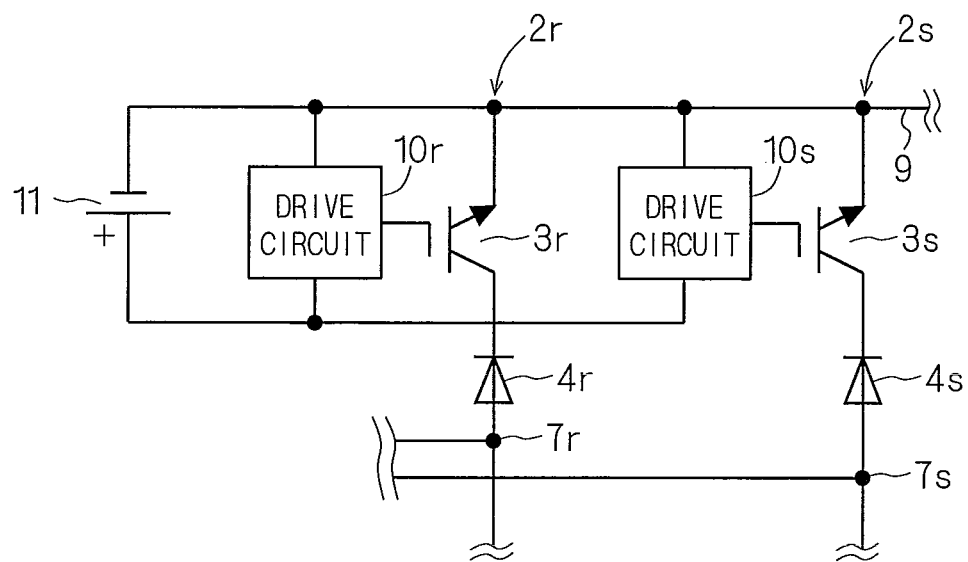

CURRENT SOURCE POWER CONVERSION CIRCUIT

TECHNICAL FIELD

The present invention is an invention relating to a current source power conversion circuit.

BACKGROUND ART

Generally, in a current source power conversion circuit, an element with a structure to block reverse conduction needs to be used for a switch circuit. For example, the switch circuit is considered to have a configuration where an IGBT (Insulated Gate Bipolar Transistor) and a diode are connected in series. Such a configuration is disclosed in Japanese Patent Application Laid-Open No. 2003-164140, for example. Further, as a current source power conversion circuit having adopted such a switch circuit made up of an IGBT and a diode, there is known one formed by multiphase combination of circuits ensuring reverse voltage resistance of the IGBT.

Moreover, the current source power conversion circuit is also used as a rectifier circuit of a current source PWM (Pulse Width Modulation). Specifically, this is disclosed in Japanese Patent Application Laid-Open No. 2007-295686.

SUMMARY OF THE INVENTION

Problem to be Solved by the Invention

In a conventional current source power conversion circuit, a potential (e.g. an emitter potential in the case of an IGBT with a current source power conversion circuit used as a rectifier circuit) applied to a switch circuit is different in each phase. Therefore, in the conventional current source power conversion circuit, it has been necessary to use an independent power supply for the switch circuit in each phase in order to drive the switch circuit in each phase. In provision of a drive power supply in each switch circuit, six drive power supplies are required in the case of a three-phase current source power conversion circuit, which has caused a problem of the current source power conversion circuit having an expensive and complicated configuration.

Accordingly, it is an object of the present invention to provide a current source power conversion circuit reducing the number of drive power supplies used and having an inexpensive and simple configuration.

Means for Solving the Problem

In order to solve the above problem, a current source power conversion circuit of the present invention is provided with a plurality of half-bridge rectifier circuits which are connected in parallel, each including a serial connection of a first switch circuit having a first self-turn-off element and a first diode which are connected in series to each other and a second switch circuit having a second self-turn-off element and a second diode which are connected in series to each other. Forward directions of the first self-turn-off element, the first diode, the second self-turn-off element, and the second diode are made uniform in the same direction in any of the half-bridge rectifier circuits, each first self-turn-off element has a first current electrode, a second current electrode, and a control electrode, and is turned on and off based upon a control signal given to the control electrode, a reference of the control signal is a potential of said first current electrode, the second current electrode of the first self-turn-off element is connected to the first diode in any of the half-bridge rectifier circuits, and a first current electrode of the first self-turn-off element in one of the half-bridge rectifier circuits and a first current electrode of the first self-turn-off element in other one of the half-bridge rectifier circuits are short-circuited and connected.

There are further provided a first drive circuit that gives the control signal to the first self-turn-off element, a capacitor charged by a power supply that drives the first drive circuit, and a second drive circuit that is driven by an electric charge having charged the capacitor and controls the second switch circuit, and a discharge blocking diode for blocking discharge of the capacitor to the power supply may exist between the power supply and the capacitor.

Further, a circuit that stores an electric charge in the capacitor may be a bootstrap circuit.

Further, a circuit that stores an electric charge in the capacitor may be a charge pump circuit.

Further, the first diode may be made to function as the discharge blocking diode.

Further, the second diode may be made to function as the discharge blocking diode.

Further, the second diode may be arranged farther away from the first switch circuit than the second self-turn-off element.

Further, at least one switch circuit out of the first switch circuit and the second switch circuit in the plurality of half-bridge rectifier circuits may be a self-turn-off element having reverse voltage resistant characteristics.

Further, the self-turn-off element having reverse voltage resistant characteristics may be made to function as the discharge blocking diode.

Effects of the Invention

According to this current source power conversion circuit, the first current electrodes of the first self-turn-off elements in the respective phases are made a common potential, whereby it is possible to reduce the number of drive power supplies used and form an inexpensive and simple configuration.

Further, the second switch circuit is controlled based upon the capacitor in which an electric charge is stored by a power supply, whereby it is possible to further reduce the number of drive power supplies used and form an inexpensive and simple configuration.

Further, the circuit that stores an electric charge in the capacitor is the bootstrap circuit, whereby it is possible to reduce the number of drive power supplies used and form an inexpensive and simple configuration.

Further, the circuit that stores an electric charge in the capacitor is the charge pump circuit, whereby it is possible to reduce the number of drive power supplies and form an inexpensive and simple configuration.

Further, the discharge blocking diode is substituted by the first diode or the second diode in the first switch circuit, whereby it is possible to further simplify a circuit configuration.

Further, the second diode is arranged farther away from the first switch circuit than the second self-turn-off element, whereby it is possible to eliminate a voltage drop of the second diode at the time of charging the capacitor and ensure a further high charged voltage of the capacitor, so as to improve the reliability of operation of the second switch circuit.

Further, at least one switch circuit out of the first switch circuit and the second switch circuit in the plurality of half-bridge rectifier circuits is the self-turn-off element having reverse voltage resistant characteristics, whereby it is possible to reduce the number of elements constituting the switch circuit, so as to simplify the circuit configuration. Moreover, a loss that occurs in the switch circuit decreases, whereby it is possible to make a heat sink for heat dissipation smaller, so as to further save space.

Further, the discharge blocking diode is substituted by the self-turn-off element having reverse voltage resistant characteristics, whereby it is possible to further simplify a circuit configuration.

Objectives, features, aspects, and advantages of the present invention are made more obvious by means of the following specific descriptions and accompanying drawings.

BRIEF DESCRIPTION OF THE DRAWINGS

FIG. 1 is a circuit diagram of a current source power conversion circuit according to Embodiment 1 of the present invention.

FIG. 3 is a circuit diagram of a current source power conversion circuit according to Embodiment 1 of the present invention.

EMBODIMENT FOR CARRYING OUT THE INVENTION

Embodiment 1

FIG. 1 shows part of a circuit diagram of a current source power conversion circuit according to the present embodiment. Further, FIG. 2 shows a circuit diagram of a conventional current source power conversion circuit.

Figure 2:
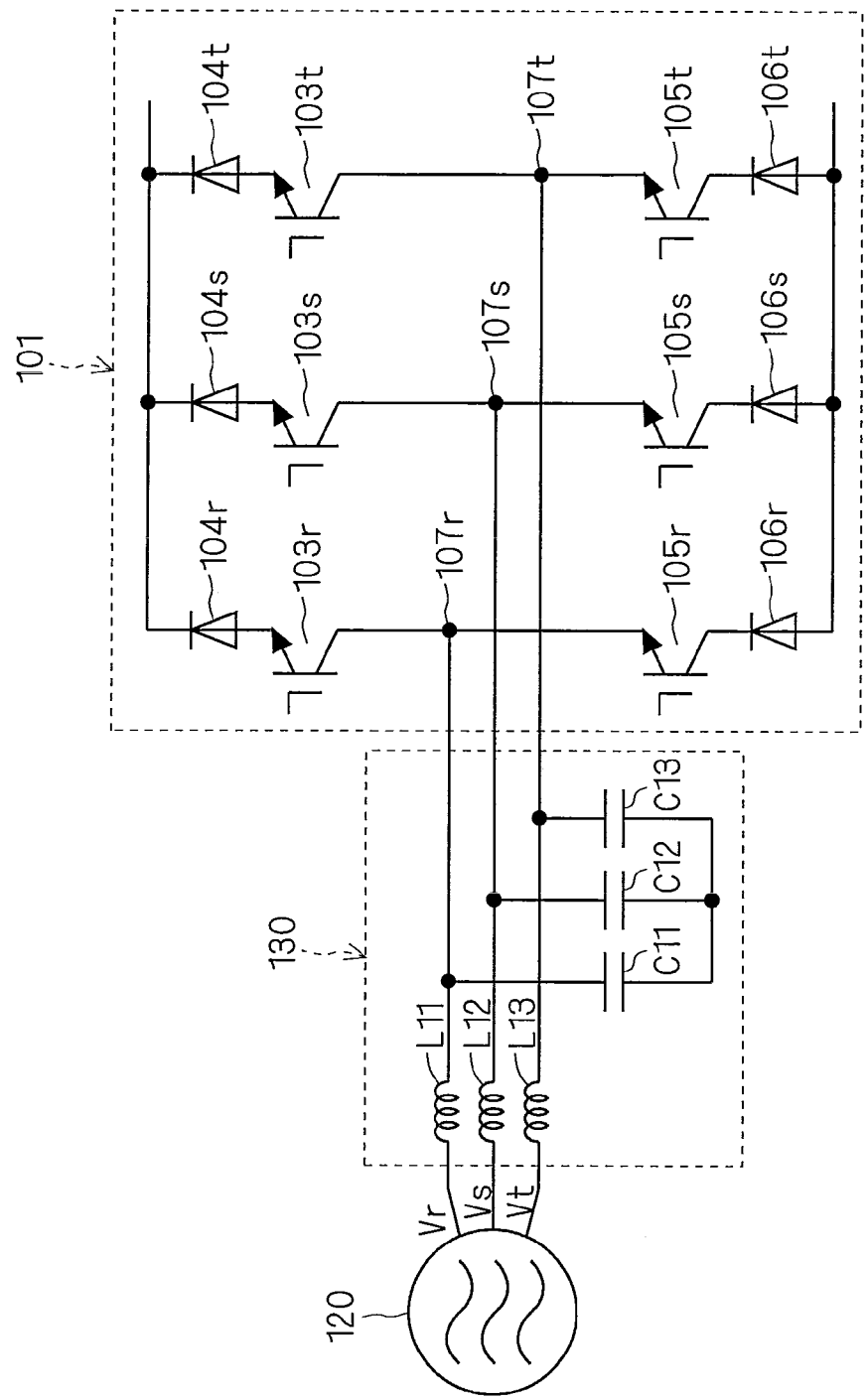
FIG. 2 is a circuit diagram of a conventional current source power conversion circuit.

First, the circuit shown in FIG. 2 is a three-phase current source rectifier circuit. FIG. 2 shows a three-phase current source rectifier circuit 101, a three-phase alternating-current power supply 120, and an LC filter circuit 130. The three-phase current source rectifier circuit shown in FIG. 2 includes three half-bridge rectifier circuits connected in parallel to one another. Specifically, the half-bridge rectifier circuit corresponding to an r-phase has IGBTs 103r, 105r and diodes 104r, 106r. Further, the half-bridge rectifier circuit corresponding to an s-phase has IGBTs 103s, 105s and diodes 104s, 106s. Moreover, the half-bridge rectifier circuit corresponding to a t-phase has IGBTs 103t, 105t and diodes 104t, 106t. The IGBTs 103r, 103s, 103t, 105r, 105s, 105t are switching elements, as well as self-turn-off elements. The diodes 104r, 104s, 104t are diodes for reverse blocking. The diodes 104r, 104s, 104t are connected in series to the IGBTs 103r, 103s, 103t, with a polarity such that the forward currents flow through the diodes 104r, 104s, 104t in the case of forward currents respectively flowing through the IGBTs 103r, 103s, 103t. Specifically, anodes of the diodes 104r, 104s, 104t and emitters of the IGBTs 103r, 103s, 103t are connected to each other. Further, the diodes 106r, 106s, 106t are diodes for reverse blocking. The diodes 106r, 106s, 106t are connected in series to the IGBTs 105r, 105s, 105t, with a polarity such that the forward currents flow through the diodes 106r, 106s, 106t in the case of forward currents respectively flowing through the IGBTs 105r, 105s, 105t. Specifically, cathodes of the diodes 106r, 106s, 106t and collectors of the IGBTs 105r, 105s, 105t are connected to each other. Collectors of IGBTs 103r, 103s, 103t and emitters of the IGBTs 105r, 105s, 105t are connected to each other via connecting points 107r, 107s, 107t. The reverse blocking diode blocks flowing of the current in a reverse direction in the self-turn-off element, while preventing application of a reverse voltage to the self-turn-off element and destruction of the element.

Further, an r-phase voltage Vr from the three-phase alternating-current power supply 120 is inputted into the connecting point 107r via a coil L11 in the LC filter circuit 130. Similarly, an s-phase voltage Vs from the three-phase alternating-current power supply 120 is inputted into the connecting point 107s via a coil L12 in the LC filter circuit 130. A t-phase voltage Vt from the three-phase alternating-current power supply 120 is inputted into the connecting point 107t via a coil L13 in the LC filter circuit 130. It is to be noted that in the LC filter circuit 130, the coils L11, L12, L13 and capacitors C11, C12, C13 are configured as a low-pass filter.

As thus described, in the three-phase current source rectifier circuit shown in FIG. 2, the emitters of the IGBTs 103r, 103s, 103t are connected to one another respectively via the diodes 104r, 104s, 104t. This prevents commonality of the emitters of the IGBTs 103r, 103s, 103t as a GND terminal of a control circuit. Further, in the three-phase current source rectifier circuit shown in FIG. 2, since different phase voltages are applied to the respective collectors of the IGBTs 103r, 103s, 103t, respective collector potentials are different. Accordingly, in the case of driving the IGBTs 103r, 103s, 103t, 105r, 105s, 105t in the three-phase current source rectifier circuit shown in FIG. 2, independent drive power supplies have been required respectively for the IGBTs 103r, 103s, 103t, 105r, 105s, 105t. In the three-phase current source rectifier circuit shown in FIG. 2, independent six drive power supplies are required.

Meanwhile, FIG. 1 shows a current source power conversion circuit according to the present embodiment, and the current source power conversion circuit is similar to FIG. 2 in being also a three-phase current source rectifier circuit. The circuit shown in FIG. 1 is a three-phase current source rectifier circuit. The three-phase current source rectifier circuit shown in FIG. 1 includes three half-bridge rectifier circuits connected in parallel to one another. Specifically, a half-bridge rectifier circuit 2r corresponding to an r-phase has IGBTs 3r, 5r and diodes 4r, 6r. Further, a half-bridge rectifier circuit 2s corresponding to an s-phase has IGBTs 3s, 5s and diodes 4s, 6s. Moreover, a half-bridge rectifier circuit 2t corresponding to a t-phase has IGBTs 3t, 5t and diodes 4t, 6t. The IGBTs 3r, 3s, 3t, 5r, 5s, 5t are switching elements, as well as self-turn-off elements. The diodes 4r, 4s, 4t are diodes for reverse blocking. The diodes 4r, 4s, 4t are connected in series to the IGBTs 3r, 3s, 3t, with a polarity such that the forward currents flow through the diodes 4r, 4s, 4t in the case of forward currents respectively flowing through the IGBTs 3r, 3s, 3t, to constitute a switch circuit in an upper arm. Specifically, cathodes of the diodes 4r, 4s, 4t and collectors of the IGBTs 3r, 3s, 3t are connected to each other. Further, the diodes 6r, 6s, 6t are diodes for reverse blocking. The diodes 6r, 6s, 6t are connected in series to the IGBTs 5r, 5s, 5t, with a polarity such that the forward currents flow through the diodes 6r, 6s, 6t in the case of forward currents respectively flowing through the IGBTs 5r, 5s, 5t, to constitute a switch circuit in a lower arm. Specifically, anodes of the diodes 6r, 6s, 6t and emitters of the IGBTs 5r, 5s, 5t are connected to each other. Anodes of the diodes 4r, 4s, 4t and cathodes of the IGBTs 6r, 6s, 6t are connected to each other via connecting points 7r, 7s, 7t. Further, the connecting points 7r, 7s, 7t are connected with a three-phase alternating-current power supply 8 via an LC filter circuit 30. It is to be noted that in the LC filter circuit 30, coils L1, L2, L3 and capacitors C1, C2, C3 are configured as a low-pass filter.

In the three-phase current source rectifier circuit shown in FIG. 1, serial connection of the IGBTs 3r, 5r and the diode 4r, 6r configured as thus described is grasped as a one-phase half-bridge rectifier circuit 2r. Similarly, serial connection of the IGBTs 3s, 5s and the diodes 4s, 6s is grasped as a one-phase half-bridge rectifier circuit 2s, and serial connection of the IGBTs 3t, 5t and the diodes 4s, 6s is grasped as a half-bridge rectifier circuit 2t. In the three-phase current source rectifier circuit shown in FIG. 1, these three half-bridge rectifier circuits 2r, 2s, 2t are connected in parallel. Further, forward directions of the IGBTs 3r, 3s, 3t, the diodes 4r, 4s, 4t, the IGBTs 5r, 5s, 5t and the diodes 6r, 6s, 6t are made uniform in the same direction in any of the half-bridge rectifier circuits 2r, 2s, 2t. Further, in the three-phase current source rectifier circuit shown in FIG. 1, emitters of the IGBTs 3r, 3s, 3t in the respective phases are connected respectively to a connection line 9 and short-circuited, thereby to make the emitters of the IGBTs 3r, 3s, 3t a common potential. That is, in the multiphase current source rectifier circuit according to the present embodiment, emitter terminals of the self-turn-off elements (3r, 3s, 3t) in the respective phases in the one-side arm are short-circuited and connected to one another, so that these emitter terminals function as a common potential.

As the three-phase current source rectifier circuit shown in FIG. 1, by connecting the emitters of the IGBTs 3r, 3s, 3t in the respective phases respectively to the connection line 9 and making these emitters function as the common potential, reference potentials of drive power supplies in drive circuits that drive the IGBTs 3r, 3s, 3t in the respective phases can be made the same potential as one another. This allows commonality of the drive power supplies for the drive circuits that drive the IGBTs 3r, 3s, 3t in the respective phases. Specifically, as shown in FIG. 3, the circuit is configured such that one drive power supply 11 is connected in parallel to drive circuits 10r, 10s that drive the IGBTs 3r, 3s in the respective phases. It should be noted that, although only two phases (r, s) in the one-side arm (upper arm) are described in the circuit diagram shown in FIG. 3, similarly, the upper arm of the half-bridge rectifier circuit 2t can also be provided with a drive circuit and the drive power supply 11 can also be shared by the drive circuit.

As thus described, in the three-phase current source rectifier circuit according to the present embodiment, the circuit configuration as in FIG. 3 can be adopted, and thereby, one drive power supply 11 can drive the respective drive circuits that drive the IGBTs on the upper arm side. Therefore, in the three-phase current source rectifier circuit according to the present embodiment, the number of drive power supplies can be made four in total, together with the respective (three) drive power supplies for the drive circuits that drive the three IGBTs 5r, 5s, 5t in the lower arm. Further, in the three-phase current source rectifier circuit according to the present embodiment, the number of wires can be reduced by reduction in number of drive power supplies, thereby to form an inexpensive and simple circuit configuration. Moreover, in the three-phase current source rectifier circuit according to the present embodiment, it is possible to seek to save space by a space corresponding to the reduced drive power supplies.

It should be noted that, although the example of using the IGBT as the self-turn-off element has been described in the present embodiment, the present invention is not restricted to this, and another element having a similar function may also be applied. Further, although the present embodiment has been described as the three-phase current source rectifier circuit, the present invention is not restricted to the three phases.

Embodiment 2

Figure 4:
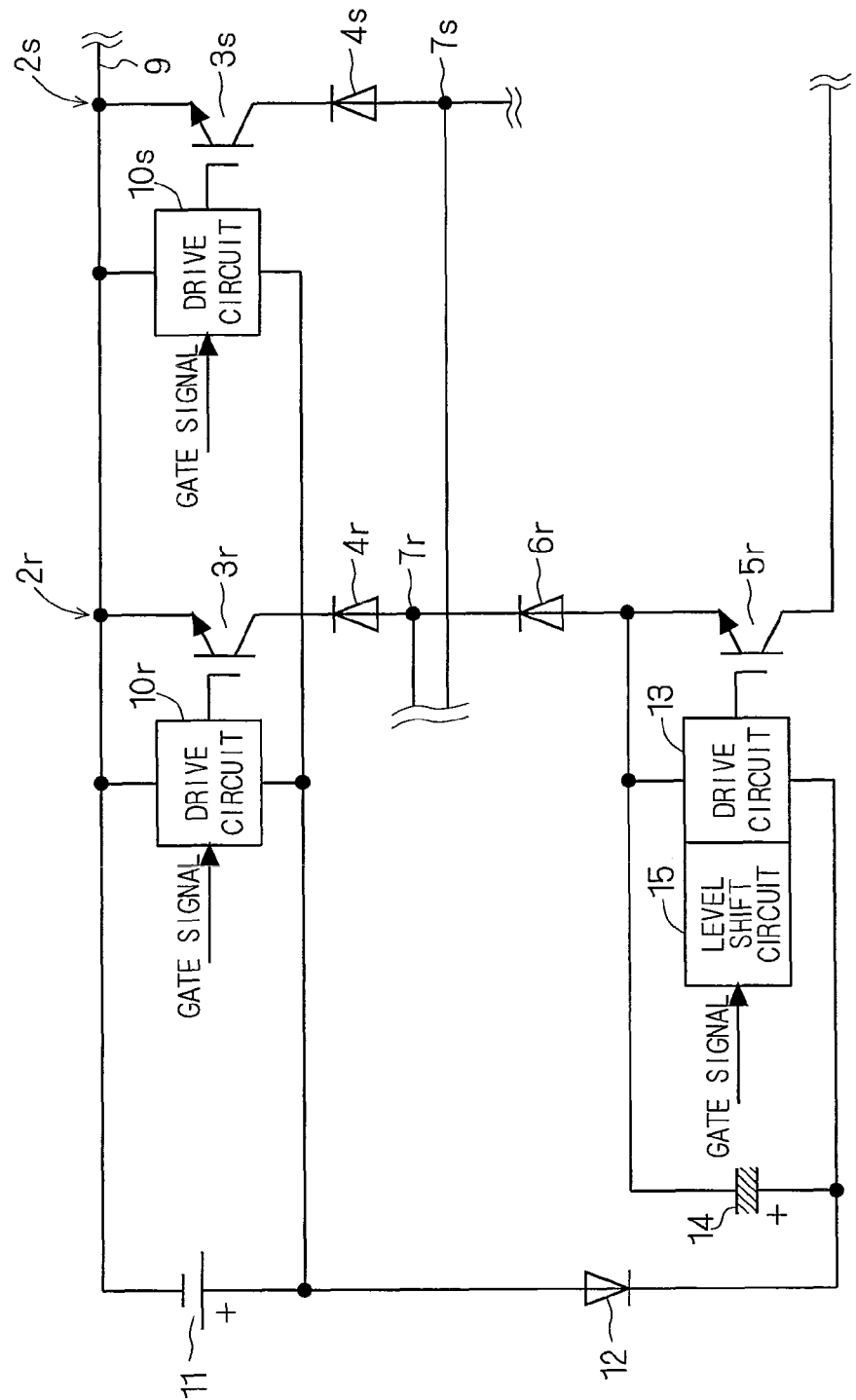
FIG. 4 is a circuit diagram of a current source power conversion circuit according to Embodiment 2 of the present invention.

FIG. 4 shows a circuit diagram of a current source power conversion circuit according to the present embodiment. Although the current source power conversion circuit shown in FIG. 4 is a three-phase current source rectifier circuit, only IGBTs 3r, 3s corresponding to the two phases (r, s) in the upper arm and the IGBT 5r corresponding to the one phase (r) in the lower arm are described in FIG. 4. Also in the current source rectifier circuit shown in FIG. 4, the emitters of the IGBTs 3r, 3s in the respective phases are connected respectively to the connection line 9, to make the emitters of the IGBTs 3r, 3s function as a common potential, thereby allowing commonality of the drive power supply 11 for the drive circuits 10r, 10s that drive the IGBTs 3r, 3s in the respective phases. As described above, the commonality of the drive power supply 11 is allowed also with respect to the drive circuit that drives the IGBT 3t.

In the lower arm of the current source rectifier circuit shown in FIG. 4, by means of a bootstrap circuit, the drive power supply 11 that drives drive circuits 10r, 10s is used, to drive a drive circuit 13 of the IGBT 5s. Specifically, the bootstrap circuit shown in FIG. 4 includes a diode 12 connected in series to the positive electrode of a drive power supply 11, and a capacitor 14 connected to the drive circuit 13 that drives IGBT 5r. In the bootstrap circuit shown in FIG. 4, a cathode of the diode 12 is connected to one terminal of the capacitor 14, and the other terminal of the capacitor 14 is connected to an anode of the diode 6r. In the bootstrap circuit shown in FIG. 4, by turning on the IGBT 3r in the upper arm, the capacitor 14 is charged by the drive power supply 11. In addition, it can also be grasped that the diode 12 is a discharge blocking diode for blocking discharge of the capacitor 14 to the power supply 11, and fulfills the function of holding a potential difference between a potential of the power supply 11 and a potential (this varies depending upon an r-phase voltage Vr) of the charged capacitor 14, to block a reverse flow to the power supply 11. Further, the diode 12 may be another element so long as having voltage resistant characteristics not less than a potential of the drive power supply 11.

In the current source rectifier circuit according to the present embodiment, the charged capacitor 14 is used for the drive power supply to drive the drive circuit 13. A reference potential of the voltage across the charged capacitor 14 is the emitter potential of the IGBT 5r. It should be noted that, according to the present embodiment, it is assumed that a reference potentials of the gate signals are the emitter potentials of the IGBTs 3r, 3s, 3t in the upper arm, respectively. Therefore a level shift circuit 15 is connected to the drive circuit 13, and suitably shifts a potential of the gate signal and inputs the gate signal into the drive circuit 13.

As thus described, in the current source rectifier circuit according to the present embodiment, through use of the bootstrap circuit, a power supply that drives the drive circuit 13 of the IGBT 5r in the lower arm is produced, to allow the commonality of the actually provided power supply 11. In addition, although the circuit configuration has been disclosed in the current source rectifier circuit shown in FIG. 4 which allows the commonality of the drive power supply with respect to the IGBT 5r corresponding to one phase (r), similarly, commonality of drive power supplies with respect to the IGBTs 5s, 5t in the other phases (s, t) can also be sought through use of the bootstrap circuit. That is, the number of drive power supplies that drive the three-phase current source rectifier circuit can be made one. Further, in the case of driving the current source rectifier circuit according to the present embodiment, the IGBTs 3r, 3s, 3t in the upper arm are brought into conduction to charge the capacitor 14 connected to the drive circuit in the lower arm, out of the need for ensuring a drive power supply voltage, before the IGBTs 5r, 5s, 5t in the lower arm start switching operations.

It should be noted that the level shift circuit shown in the present embodiment is replaceable by an insulating circuit using a photo coupler, or the like. Further, in the case of the reference potential of the gate signal being different from the emitter potentials of the IGBTs 3r, 3s, 3t in the upper arm, the level shift circuit or the insulating circuit is also required in the upper arm.

Modified Example

Although the configuration using the bootstrap circuit has been described in the current source rectifier circuit shown in FIG. 4, another circuit configuration may also be adopted so long as being a configuration which further includes the capacitor 14 to be charged by the drive power supply 11 and the diode 12 for blocking discharge of the capacitor 14 to the drive power supply 11, and drives the drive circuit in the lower arm by the electric charge having charged the capacitor 14.

Figure 5:
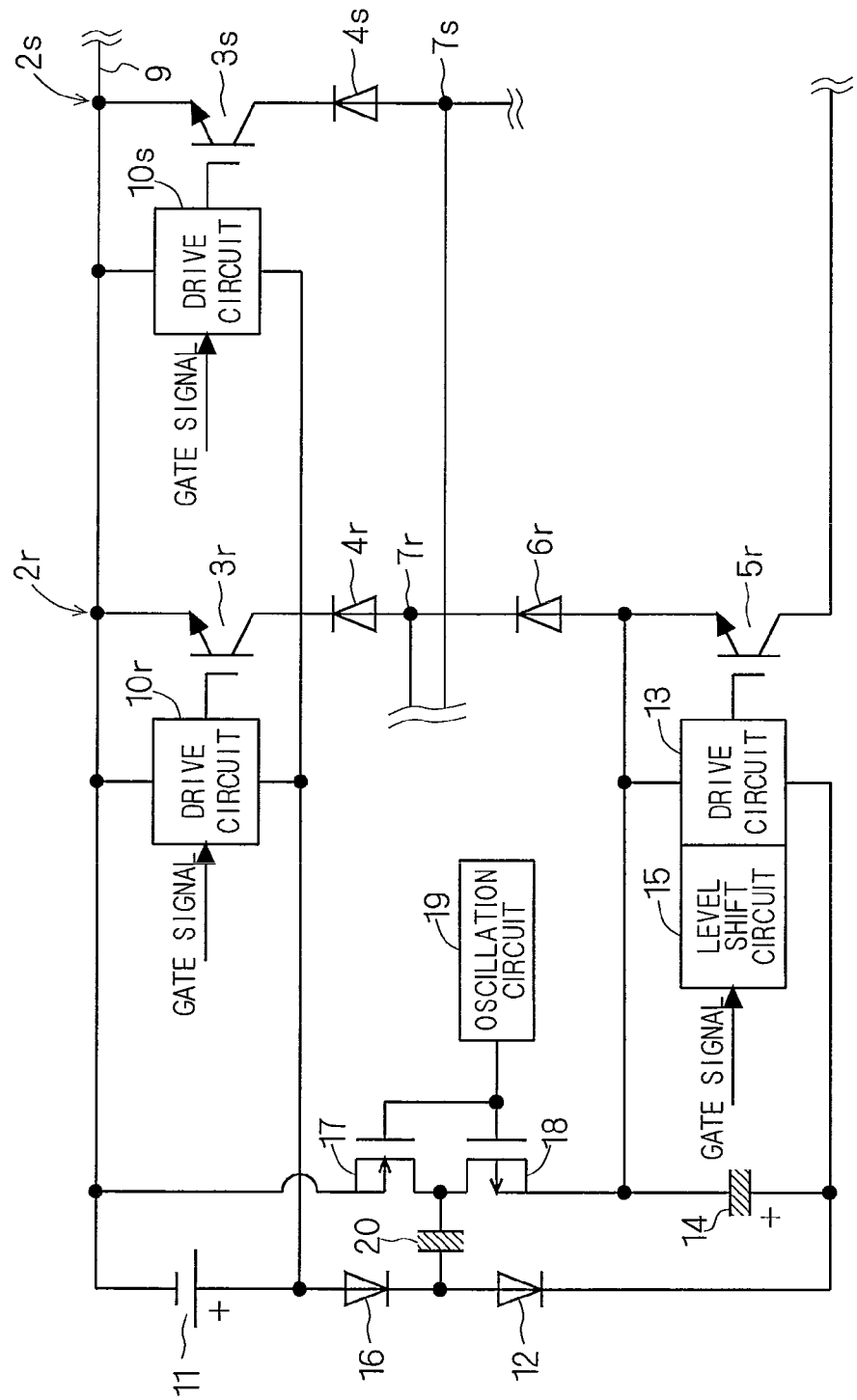
FIG. 5 is a circuit diagram of a current source power conversion circuit according to a modified example of Embodiment 2 of the present invention.

Specifically, in the current source rectifier circuit according to the present modified example, a circuit configuration using a charge pump circuit in place of the bootstrap circuit is described. FIG. 5 shows a circuit diagram of a current source power conversion circuit according to the present modified example. Although the current source power conversion circuit shown in FIG. 5 is a three-phase current source rectifier circuit, only IGBTs 3r, 3s corresponding to the two phases (r, s) in the upper arm and the IGBT 5r corresponding to the one phase (r) in the lower arm are described in FIG. 5 It should be noted that, since the current source power conversion circuit shown in FIG. 5 is the same as the current source power conversion circuit shown in FIG. 4 except for the charge pump circuit, the same reference numerals are given to the same constitutional elements, and a detailed description is omitted.

Specifically, the charge pump circuit shown in FIG. 5 includes diodes 12, 16 connected in series to the positive electrode of the drive power supply 11, and a capacitor 14 connected to the drive circuit 13 that drives IGBT 5r. Further, the charge pump circuit shown in FIG. 5 includes switch elements (e.g., MOSFETs) 17, 18 connected in series to a negative electrode of the drive power supply 11 and one terminal of the capacitor 14, an oscillation circuit 19 that controls the switch elements, and a capacitor 20 connected to a point between the diodes 12, 16 and to a point between the switch elements 17, 18.

In the charge pump circuit shown in FIG. 5, one terminal of the capacitor 14 is connected to an anode of the diode 6r and the switch element 18, and the other terminal of the capacitor 14 is connected to a cathode of the diode 12. Further, the oscillation circuit 19 makes the switch elements 17, 18 perform an exclusive operation. Hence in the charge pump circuit shown in FIG. 5, the capacitor 20 is charged by the drive power supply 11 when the switch element 17 is turned on and the switch element 18 is turned off. Next, an electric charge staying in the capacitor 20 is moved to the capacitor 14 when the switch element 17 is turned off and the switch element 18 is turned on.

Also in the three-phase current source rectifier circuit according to the present modified example, the charged capacitor 14 is used for the drive power supply to drive the drive circuit 13. A reference potential of the voltage across the charged capacitor 14 is the emitter potential of the IGBT 5r. It should be noted that the level shift circuit 15 is connected to the drive circuit 13, and suitably shifts a potential of the gate signal and inputs the gate signal into the drive circuit 13.

As thus described, in the three-phase current source rectifier circuit according to the present modified example, through use of the charge pump circuit, a power supply that drives the drive circuit 13 of the IGBT 5r in the lower arm is produced, to allow the commonality of the actually provided power supply 11. In addition, although the circuit configuration has also been disclosed in the three-phase current source rectifier circuit shown in FIG. 5 which allows the commonality of the drive power supply with respect to the IGBT 5r corresponding to one phase (r), similarly, commonality of drive power supplies of the IGBTs 5s, 5t in the other phases (s, t) can also be sought through use of the charge pump circuit. That is, the number of drive power supplies that drive the three-phase current source rectifier circuit can be made one.

Embodiment 3

Figure 6:
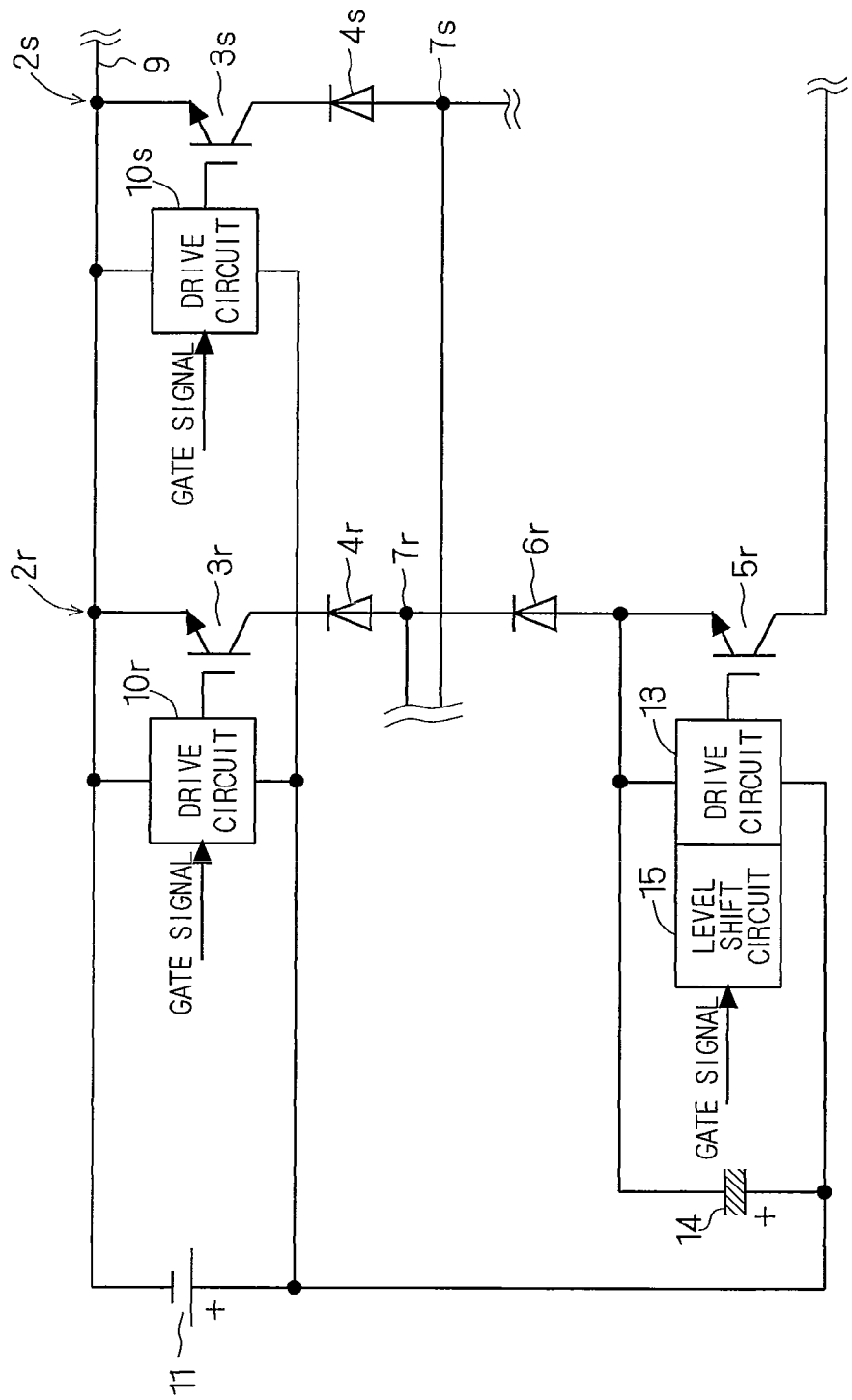
FIG. 6 is a circuit diagram of a current source power conversion circuit according to Embodiment 3 of the present invention.

FIG. 6 shows a circuit diagram of a current source power conversion circuit according to the present embodiment. The current source power conversion circuit shown in FIG. 6 is a three-phase current source rectifier circuit. A configuration of the three-phase current source rectifier circuit shown in FIG. 6 is almost the same as the configuration of the three-phase current source rectifier circuit shown in FIG. 4, but is different in no inclusion of the diode 12. The diode 12 is a discharge blocking diode for blocking discharge of the capacitor 14 to the power supply 11. In the three-phase current source rectifier circuit according to the present embodiment, the function of the diode 12 is substituted by the diode 4r connected in series to the IGBT 3r. However, the diode 4r needs to have voltage resistant characteristics which are required of the diode 12. In a voltage source inverter and rectifier circuit, and a current source inverter, normally, a drive power supply is provided taking a low potential of a direct current bus (or high-frequency link, etc.) as a reference potential. Hence the potential of the capacitor charged by the bootstrap circuit may be higher than that of the drive power supply, and the diode 12 is required to have voltage resistance not less than the potential of direct current bus (or high-frequency rink, etc.). In the present example, the diode 12 can be substituted by the diode 4r since the drive power supply is provided taking a high potential of the direct current bus (or high-frequency link, etc.) as a reference potential, and voltage resistance has been imparted to the diode 4r in the current source power conversion circuit.

It should be noted that in the same configuration as the three-phase current source rectifier circuit shown in FIG. 4, the same reference numerals are given to the same constitutional elements, and a detailed description of the three-phase current source rectifier circuit shown in FIG. 6 is omitted.

As thus described, in the three-phase current source rectifier circuit according to the present embodiment, the diode 12 is substituted by the diode 4r, and thereby, the discharge blocking diode can be eliminated, to seek simplification of the circuit. It should be noted that in the three-phase current source rectifier circuit shown in FIG. 6, although discharge prevention of the capacitor 14 corresponding to one phase (r) has been described, similarly, the diodes 4s, 4t can also be made to function as the discharge blocking diodes in the other phases (s, t). Further, also in the case of driving the three-phase current source rectifier circuit according to the present embodiment, the IGBTs 3r, 3s, 3t in the upper arm are brought into conduction out of the need for ensuring a drive power supply voltage before the IGBTs 5r, 5s, 5t in the lower arm start switching operations.

Further, although the three-phase current source rectifier circuit shown in FIG. 6 has a circuit configuration using the bootstrap circuit, similarly, the configuration according to the present embodiment is also applicable to the three-phase current source rectifier circuit using the charge pump circuit. However, in the three-phase current source rectifier circuit (corresponding to FIG. 5) using the charge pump circuit, the function of the diode 12 is substituted by the diode 6r connected in series to the IGBT 5r.

Embodiment 4

Figure 7:
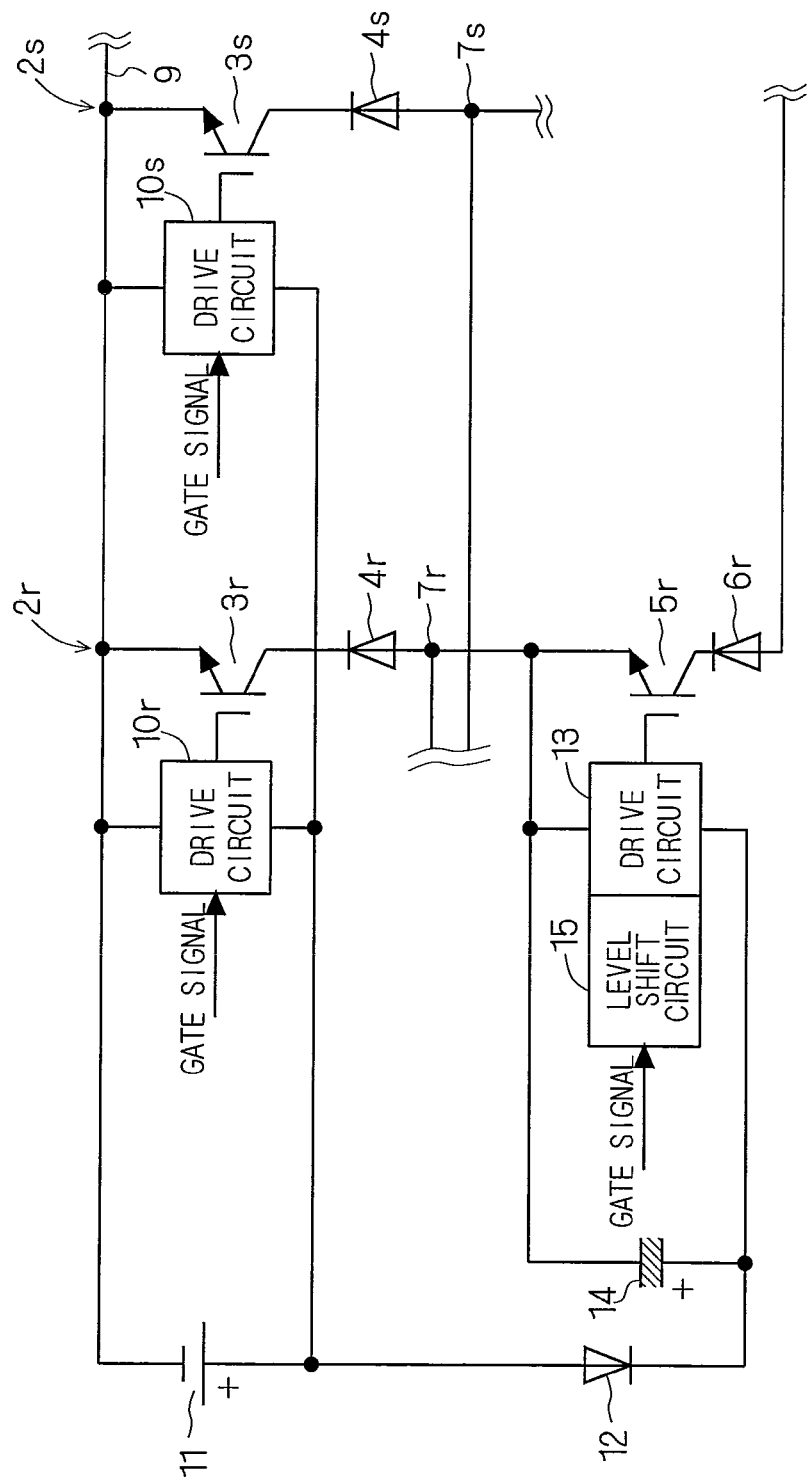
FIG. 7 is a circuit diagram of a current source power conversion circuit according to Embodiment 4 of the present invention.

FIG. 7 shows a circuit diagram of a current source power conversion circuit according to the present embodiment. The current source power conversion circuit shown in FIG. 7 is a three-phase current source rectifier circuit. A configuration of the three-phase current source rectifier circuit shown in FIG. 7 is almost the same as the configuration of the three-phase current source rectifier circuit shown in FIG. 4, but is different in a connected position of the diode 6r. Although the diode 6r has been connected on the emitter side of the IGBT 5r in FIG. 4, it is connected on the collector side of the IGBT 5r in the present embodiment. That is, in FIG. 7, the diode 6r is arranged farther away from the switch circuit (IGBT 3r, diode 4r) in the upper arm than the IGBT 5r.

It is to be noted that in the same configuration as the three-phase current source rectifier circuit shown in FIG. 4, the same reference numerals are given to the same constitutional elements, and a detailed description of the three-phase current source rectifier circuit shown in FIG. 7 is omitted.

As thus described, in the three-phase current source rectifier circuit according to the present embodiment, the diode 6r for reverse blocking is connected on the collector side of the IGBT 5r away from the switch circuit in the upper arm, and thereby, a voltage drop of the diode 6r can be eliminated at the time of charging the capacitor 14. For this reason, in the three-phase current source rectifier circuit according to the present embodiment, it is possible to ensure a further high drive power supply voltage (charged voltage of the capacitor 14) for driving the drive circuit 13 of the IGBT 5r, so as to improve the reliability of the operation. It should be noted that in the three-phase current source rectifier circuit shown in FIG. 7, elimination of the voltage drop of the capacitor 14 corresponding to one phase (r) has been described, similarly, the diodes 6s, 6t can also be arranged away from the switch circuit in the upper arm, to eliminate voltage drops of the capacitor in the other phases (s, t). Moreover, with the potential of the drive power supply 11 being higher than the high potential of the direct current bus (or high-frequency rink), the potential of the capacitor 14 may be high, and a potential difference between the emitter potential of the IGBT 5r in the lower arm and the low potential of the direct current bus may be large. However, also in that case, the diode 6r can be imparted with voltage resistant characteristics, thereby preventing the IGBT 5r in the lower arm from being destroyed due to shortage of reverse voltage resistance.

Further, although the three-phase current source rectifier circuit shown in FIG. 7 has a circuit configuration using the bootstrap circuit, similarly, the configuration according to the present embodiment is also applicable to the current source rectifier circuit using the charge pump circuit. Moreover, although the description has been given with the configuration provided with the diode 12 in the three-phase current source rectifier circuit shown in FIG. 7, the present invention is not restricted to this, and as in the three-phase current source rectifier circuit shown in FIG. 6, the diode 12 may be substituted by the diode 4r.

Embodiment 5

Figure 8:
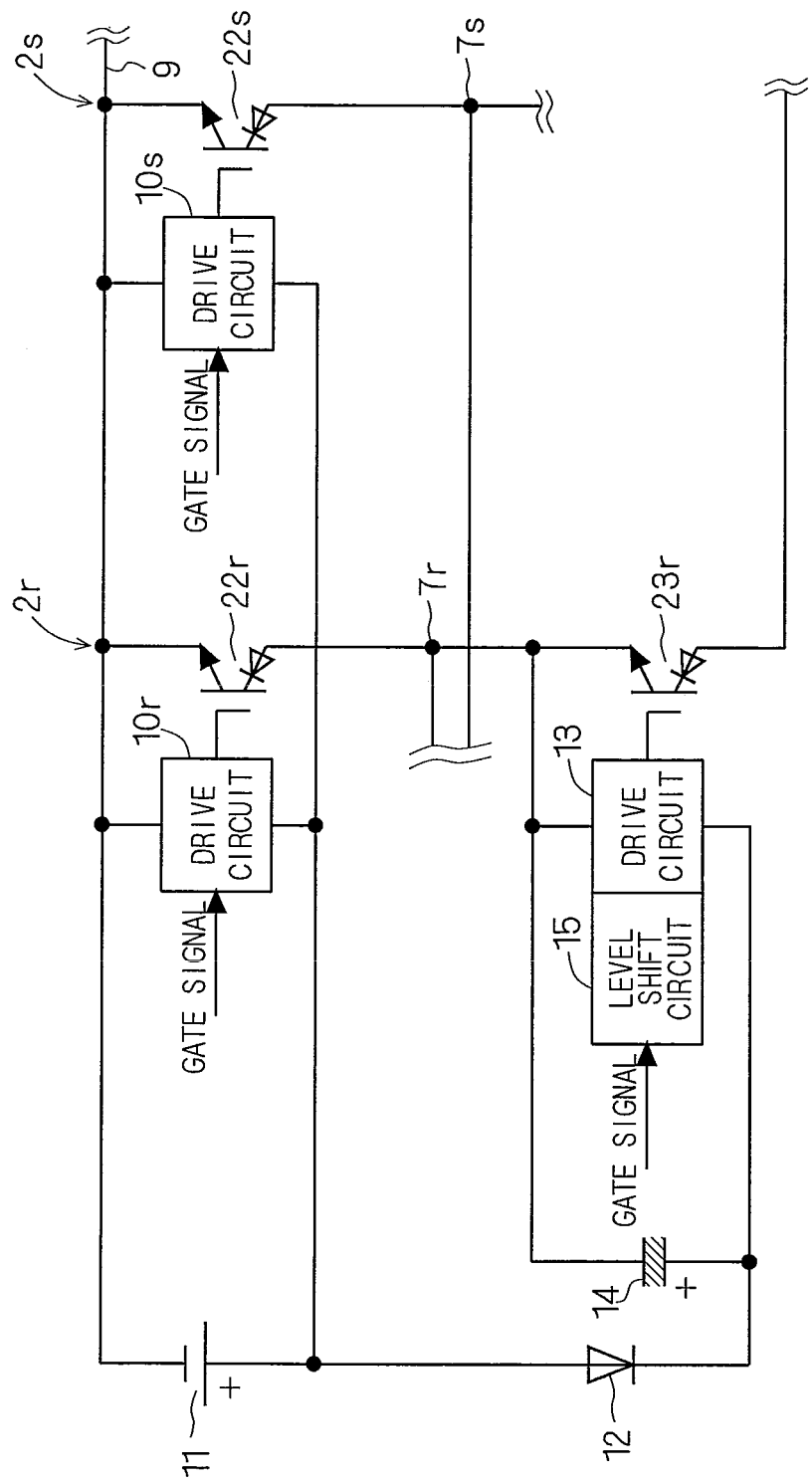
FIG. 8 is a circuit diagram of a current source power conversion circuit according to Embodiment 5 of the present invention.

FIG. 8 shows a circuit diagram of a current source power conversion circuit according to the present embodiment. The current source power conversion circuit shown in FIG. 8 is a three-phase current source rectifier circuit. In the current source power conversion circuits according to Embodiments 1 to 4, the switch circuits of the half-bridge rectifier circuits 2r, 2s, 2t have been made up of the IGBTs 3r, 3s, 3t, 5r, 5s, 5t being the self-turn-off elements and the diodes 4r, 4s, 4t, 6r, 6s, 6t. However, in the current source power conversion circuit shown in FIG. 8, the switch circuits of the half-bridge rectifier circuit 2r, 2s are made up of self-turn-off elements 22r, 22s, 23r having reverse voltage resistance in place of the IGBTs 3r, 3s, 5r and the diodes 4r, 4s, 6r. It is to be noted that an RB-IGBT (Reverse Blocking Insulated Gate Bipolar Transistor) is cited as the self-turn-off elements 22r, 22s, 23r having reverse voltage resistance, for example. Further, since the current source power conversion circuit shown in FIG. 8 is the same as the current source power conversion circuit shown in FIG. 4 except for the self-turn-off elements 22r, 22s, 23r, the same constitutional numerals are given to the same constitutional elements, and a detailed description is omitted. Further, although the current source power conversion circuit shown in FIG. 8 is a three-phase current source rectifier circuit, as in FIG. 4, only the self-turn-off elements 22r, 22s corresponding to the two phases (r, s) in the upper arm and the self-turn-off element 23r corresponding to the one phase (r) in the lower arm are described in FIG. 8.

In the current source power conversion circuit shown in FIG. 8, the number of elements constituting the switch circuit is reduced as compared with the switch circuit (IGBTs 3r, 3s, 3t, 5r, 5s, 5t and diodes 4r, 4s, 4t, 6r, 6s, 6t) of the current source power conversion circuit shown in FIG. 4. Therefore, in the current source power conversion circuit shown in FIG. 8, the circuit configuration can be further simplified and an inexpensive configuration is formed. Further, in the current source power conversion circuit shown in FIG. 8, since a loss that occurs in the switch circuit decreases, a heat sink for heat dissipation can be made smaller, so as to further seek to save space.

Modified Example

Figure 9:
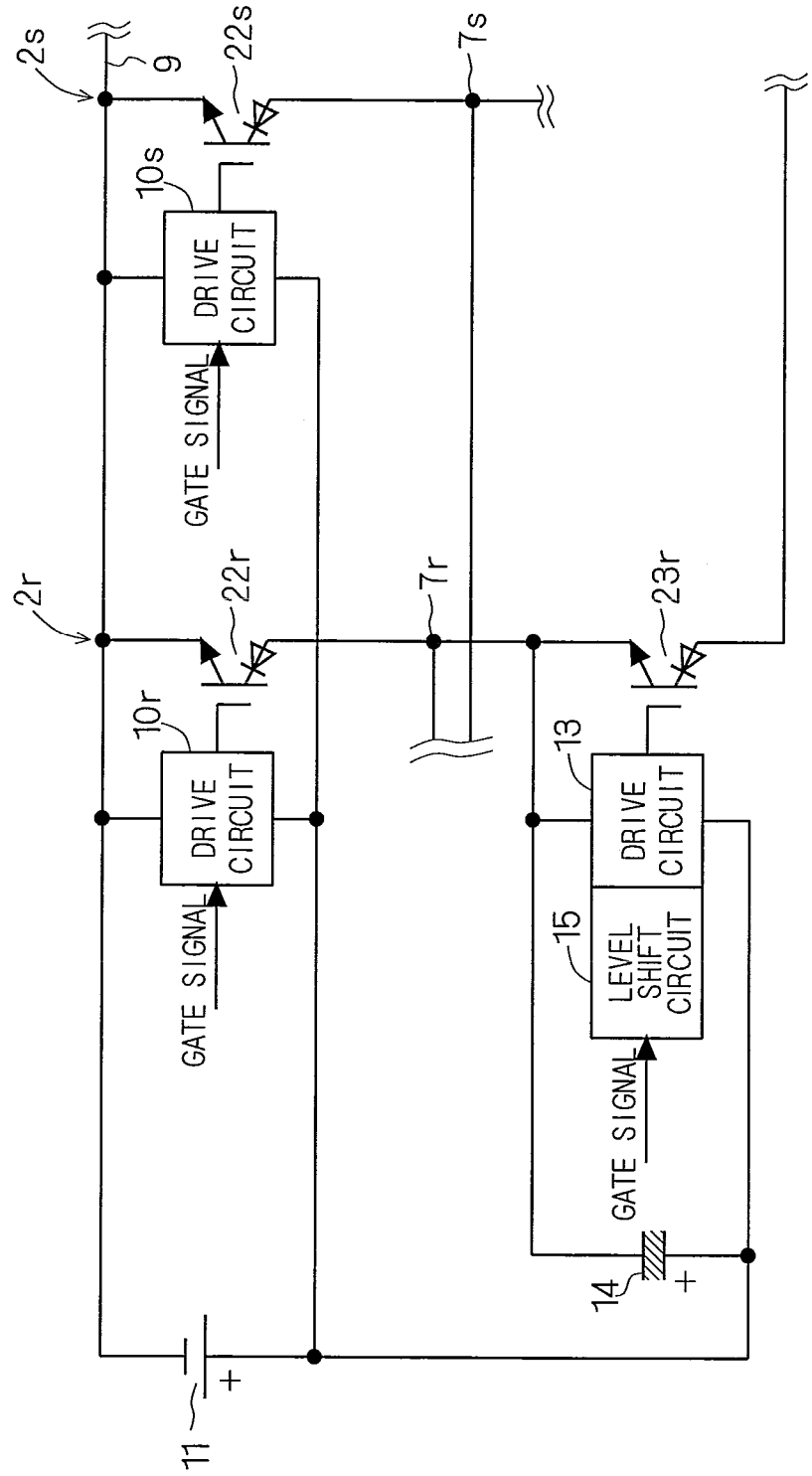
FIG. 9 is a circuit diagram of a current source power conversion circuit according to a modified example of Embodiment 5 of the present invention.

FIG. 9 is a circuit diagram of a current source power conversion circuit according to Modified Example 1 of the present embodiment. The current source power conversion circuit shown in FIG. 9 is a three-phase current source rectifier circuit. The current source power conversion circuit shown in FIG. 9 is one obtained by applying the configuration of Embodiment 3 to the current source power conversion circuit shown in FIG. 8. That is, the current source power conversion circuit shown in FIG. 9 has a circuit configuration in which the self-turn-off elements 22r, 22s, 23r having reverse voltage resistant characteristics are also imparted with a function as the discharge blocking diode, thereby to eliminate the diode 12. It should be noted that, since the current source power conversion circuit shown in FIG. 9 is the same as the current source power conversion circuit shown in FIG. 8 except for elimination of the diode 12, the same constitutional numerals are given to the same constitutional elements, and a detailed description is omitted. Further, although the current source power conversion circuit shown in FIG. 9 is a three-phase current source rectifier circuit, as in FIG. 4, only the self-turn-off elements 22r, 22s corresponding to the two phases (r, s) in the upper arm and the self-turn-off element 23r corresponding to the one phase (r) in the lower arm are described in FIG. 9. It is to be noted that in FIGS. 8 and 9, as the self-turn-off elements 22r, 22s, 23r having reverse voltage resistant characteristics, the RB-IGBT is represented by use of a symbol as shown in the drawing.

As thus described, in the current source power conversion circuit according to the present modified example, as in Embodiment 3, since the number of elements constituting the switch circuit decreases and a voltage drop in the switch circuit decreases, a further high charged voltage of the capacitor 14 can be ensured. Therefore, in the current source power conversion circuit according to the present modified example, the reliability in the operation of the switch circuit in the lower arm can further be improved.

Embodiment 6

By use of the current source power conversion circuits according to Embodiments 1 to 5 and the modified examples thereof, it is possible to configure the current source power conversion circuit, including the drive circuit, with simple circuit. This allows configuration of the current source power conversion circuit in a space saving manner. Thereat, in the present embodiment, the current source power conversion circuits according to Embodiments 1 to 5 and the modified examples thereof can be placed inside one module, to realize a current source power conversion circuit module.

While the present invention has been described in detail, the foregoing description is in all aspects illustrative, and not restrictive for the present invention. It is understood that numerous non-illustrated modified examples can be devised without departing from the scope of the present invention.

EXPLANATION OF REFERENCE NUMERALS 3, 5, 103, 105 IGBT
4, 6, 12, 16, 104, 106 diode
7 connecting point
8, 120 three-phase alternating-current power supply
9 connection line
10, 13, drive circuit
14, 20 capacitor
15 level shift circuit
17, 18 switch element
19 oscillation circuit
22, 23 self-turn-off element
30, 130 LC filter circuit
101 three-phase current source rectifier circuit

The invention claimed is:

1. A current source power conversion circuit, provided with a plurality of half-bridge rectifier circuits which are connected in parallel, each comprising a serial connection of a first switch circuit having a first self-turn-off element and a first diode which are connected in series to each other and a second switch circuit having a second self-turn-off element and a second diode which are connected in series to each other, wherein
   forward directions of said first self-turn-off element, said first diode, said second self-turn-off element, and said second diode are made uniform in the same direction in any of said half-bridge rectifier circuits,
   each said first self-turn-off element has a first current electrode, a second current electrode, and a control electrode, and is turned on and off based upon a control signal given to said control electrode, a reference of said control signal being a potential of said first current electrode,
   said second current electrode of said first self-turn-off element is connected to said first diode in any of said half-bridge rectifier circuits, and
   a first current electrode of said first self-turn-off element in one of said half-bridge rectifier circuits and a first current electrode of said first self-turn-off element in other one of said half-bridge rectifier circuits are short-circuited and connected.

2. The current source power conversion circuit according to claim 1, wherein at least one switch circuit out of said first switch circuit and said second switch circuit in said plurality of half-bridge rectifier circuits is a self-turn-off element having reverse voltage resistant characteristics.

3. The current source power conversion circuit according to claim 2, wherein said self-turn-off element having reverse voltage resistant characteristics functions as said discharge blocking diode.

4. The current source power conversion circuit according to claim 1, further comprising:
   a first drive circuit that gives said control signal to said first self-turn-off element;
   a capacitor charged by a power supply that drives said first drive circuit; and
   a second drive circuit that is driven by an electric charge having charged said capacitor and controls said second switch circuit, wherein
   a discharge blocking diode blocking discharge of said capacitor to said power supply exists between said power supply and said capacitor.

5. The current source power conversion circuit according to claim 4, wherein at least one switch circuit out of said first switch circuit and said second switch circuit in said plurality of half-bridge rectifier circuits is a self-turn-off element having reverse voltage resistant characteristics.

6. The current source power conversion circuit according to claim 5, wherein said self-turn-off element having reverse voltage resistant characteristics functions as said discharge blocking diode.

7. The current source power conversion circuit according to claim 4, wherein a circuit that stores an electric charge in said capacitor is a charge pump circuit.

8. The current source power conversion circuit according to claim 7, wherein said second diode functions as said discharge blocking diode.

9. The current source power conversion circuit according to claim 7, wherein at least one switch circuit out of said first switch circuit and said second switch circuit in said plurality of half-bridge rectifier circuits is a self-turn-off element having reverse voltage resistant characteristics.

10. The current source power conversion circuit according to claim 9, wherein said self-turn-off element having reverse voltage resistant characteristics functions as said discharge blocking diode.

11. The current source power conversion circuit according to claim 4, wherein a circuit that stores an electric charge in said capacitor is a bootstrap circuit.

12. The current source power conversion circuit according to claim 11, wherein at least one switch circuit out of said first switch circuit and said second switch circuit in said plurality of half-bridge rectifier circuits is a self-turn-off element having reverse voltage resistant characteristics.

13. The current source power conversion circuit according to claim 12, wherein said self-turn-off element having reverse voltage resistant characteristics functions as said discharge blocking diode.

14. The current source power conversion circuit according to claim 11, wherein said second diode functions as said discharge blocking diode.

15. The current source power conversion circuit according to claim 14, wherein at least one switch circuit out of said first switch circuit and said second switch circuit in said plurality of half-bridge rectifier circuits is a self-turn-off element having reverse voltage resistant characteristics.

16. The current source power conversion circuit according to claim 11, wherein said first diode functions as said discharge blocking diode.

17. The current source power conversion circuit according to claim 16, wherein said second diode is arranged farther away from said first switch circuit than said second self-turn-off element.

18. The current source power conversion circuit according to claim 17, wherein at least one switch circuit out of said first switch circuit and said second switch circuit in said plurality of half-bridge rectifier circuits is a self-turn-off element having reverse voltage resistant characteristics.

19. The current source power conversion circuit according to claim 16, wherein at least one switch circuit out of said first switch circuit and said second switch circuit in said plurality of half-bridge rectifier circuits is a self-turn-off element having reverse voltage resistant characteristics.

20. The current source power conversion circuit according to claim 19, wherein said self-turn-off element having reverse voltage resistant characteristics functions as said discharge blocking diode.

* * * * *